United States Patent [19]

Chianelli et al.

[11] 4,166,160
[45] Aug. 28, 1979

[54] CELLS HAVING CATHODES DERIVED FROM AMMONIUM-MOLYBDENUM-CHALCOGEN COMPOUNDS

[75] Inventors: Russell R. Chianelli, North Branch; Allan J. Jacobson, Princeton; M. Stanley Whittingham, Fanwood, all of N.J.

[73] Assignee: Exxon Research & Engineering Co., Florham Park, N.J.

[21] Appl. No.: 933,451

[22] Filed: Aug. 14, 1978

Related U.S. Application Data

[63] Continuation-in-part of Ser. No. 883,919, Mar. 6, 1978, abandoned.

[51] Int. Cl.² ............................................... H01M 4/58
[52] U.S. Cl. .................................................... 429/218
[58] Field of Search ....................... 429/218, 194, 191

[56] References Cited

U.S. PATENT DOCUMENTS 3,915,740  10/1975  Eisenberg ...................... 429/218 X Primary Examiner—Charles F. LeFevour
Attorney, Agent, or Firm—Kenneth P. Glynn

[57] ABSTRACT

The present invention is directed to an electric current-producing cell which contains:

a cathode having as its cathode-active material one or more compounds selected from:

(i) those having the formula:

$$(NH_4)_xMoZ_y \qquad (1)$$

wherein Z is a chalcogen selected from the group consisting of sulfur, selenium, sulfur-selenium mixtures, sulfur-oxygen mixtures and selenium-oxygen mixtures, wherein x is a numerical value of about 2, and wherein y is a numerical value of about 4;

(ii) compounds of the above formula wherein one or more hydrogens is substituted with a radical selected from alkyl radicals having 1 to 20 carbon atoms and alkyl amine radicals having 1 to 20 carbon atoms;

(iii) those having the formula:

$$(NH_3-R-NH_3)MoZ_y \qquad (2)$$

wherein R is a methylene radical or a polymethylene radical having 2 to 20 carbon atoms, and wherein Z and y are as defined; and, (iv) the amorphous decomposition products of one or more compounds of subparagraphs (i), (ii) and (iii) resulting from the decomposition thereof below about 350° C.

39 Claims, No Drawings

CELLS HAVING CATHODES DERIVED FROM AMMONIUM-MOLYBDENUM-CHALCOGEN COMPOUNDS

CROSS REFERENCE TO RELATED APPLICATIONS

This application is a continuation-in-part of copending application Ser. No. 883,919 filed Mar. 6, 1978 now abandoned.

BACKGROUND OF THE INVENTION

1. Field of the Invention

The present invention relates to electric current-producing cells, and more particularly to such cells employing specified cathode-active materials comprising or derived from ammonium-molybdenum-chalcogenide compounds.

2. Description of the Prior Art

There has been considerable interest in recent years in developing high energy density batteries for voltaic cells. Exemplary of the developing systems is a high energy density electrochemical cell utilizing intercalation compounds of the transition metal chalcogenides as cathode-active materials and using alkali metal anodes, as set forth in U.S. Pat. No. 4,009,052. U.S. Pat. No. 3,915,740 describes a cell having lithium anode-active material and $MoS_x$ (where $2<x<3$) as its cathode-active material, and U.S. Pat. No. 3,864,167 describes some fibrous transition metal trichalcogenides as cathode-active materials. U.S. Pat. No. 3,655,585 describes a cell utilizing as cathode active material vanadium pentoxide, prepared by the thermal decomposition of ammonium vanadate.

U.S. Pat. Nos. 3,898,096; 3,925,098 and 4,003,753 describe electrochemical cells having alkali metal anodes, e.g., lithium, having molten salt electrolytes, and having cathodes containing chalcogenides such as Cu and Fe sulfides, Ni sulfide and oxide and molybdenum sulfide, as well as potassium thiomolybdate $K_2MoS_4$.

The compounds utilized as the cathode active materials in the cells of the present invention are ammonium-molybdenum-chalcogenide type compounds. In this regard, it should be noted that ammonium-metal-chalcogenide compounds are known, as exemplified by U.S. Pat. No. 2,435,380. However, notwithstanding the considerable variety of high energy density electrochemical cell systems which have recently been developed, it is believed that the particular cells of the present invention containing the ammonium-molybdenum-chalcogenides have not been heretofore disclosed or rendered obvious.

SUMMARY OF THE INVENTION

The present invention is directed to an electric current-producing cell which contains:

(a) an anode having as its anode-active material one or more metals selected from the group consisting of the Periodic Table Group IA metals, Group IB metals, Group IIA metals and Group IIB metals;

(b) a cathode having as its cathode-active material one or more compounds selected from:

(i) those having the formula:

$$(NH_4)_xMoZ_y \qquad (1)$$

wherein Z is a chalcogen selected from the group consisting of sulfur, selenium, sulfur-selenium mixtures, sulfur-oxygen mixtures and selenium-oxygen mixtures, wherein x is a numerical value of about 2, and wherein y is a numerical value of about 4;

(ii) compounds of the above formula wherein one or more hydrogens is substituted with a radical selected from alkyl radicals having 1 to 20 carbon atoms and alkyl amine radicals having 1 to 20 carbon atoms;

(iii) those having the formula:

$$(NH_3-R-NH_3)MoZ_y \qquad (2)$$

wherein R is a methylene radical or a polymethylene radical having 2 to 20 carbon atoms, and wherein Z and y are as defined; and, (IV) the amorphous decomposition products of one or more compounds of subparagraphs (i), (ii) and (iii) resulting from the decomposition thereof below about 350° C; and, (c) an electrolyte which is chemically inert with respect to said anode and said cathode and which permits the migration of ions between said anode and said cathode.

DETAILED DESCRIPTION OF THE INVENTION

As mentioned, the electric current-producing cell of the present invention is one which contains a specified anode, a functional electrolyte, and a cathode having as its cathode-active material compounds derived from ammonium-molybdenum-chalcogenide compounds.

In general, the anode employed in the cell of the present invention is one which contains as its anode-active material one or more metals selected from the group consisting of the Periodic Table Group IA metals, Group IB metals, Group IIA metals and Group IIB metals. Of these, the Group IA metals, also known as the alkali metals, are desirable. Preferred is the anode having as its anode-active material a metal selected from the group consisting of lithium and sodium, and most preferably lithium. The anode-active material may be in contact with other metal structures in the cell of the present invention, depending upon the particular anode-active material being used. Thus, for example, some anode-active materials are self-supporting and may also serve as current collectors whereas other anode-active materials, e.g., lithium, may be in contact with other metal structures, such as nickel, copper or silver screen, which serve as current collectors. These anode configurations are a matter of design depending upon the particular anode-active material being used and are well known in the art.

The cathode employed in the cell of the present invention is one which contains as its cathode-active material one or more compounds selected from the group consisting of:

(i) those having the formula:

$$(NH_4)_xMoZ_y \qquad (1)$$

wherein Z is a chalcogen selected from the group consisting of sulfur, selenium, sulfur-selenium mixtures, sulfur-oxygen mixtures and selenium-oxygen mixtures, wherein x is a numerical value of about 2, and wherein y is a numerical value of about 4;

(ii) compounds of the above formula wherein one or more hydrogens is substituted with a radical selected from alkyl radicals having 1 to 20 carbon atoms and alkyl amine radicals having 1 to 20 carbon atoms;

(iii) those having the formula:

$$(NH_3-R-NH_3)MoZ_y \qquad (2)$$

wherein R is a methylene radical or a polymethylene radical having 2 to 20 carbon atoms, and wherein Z and y are as defined; and, (iv) the amorphous decomposition products of one or more compounds of subparagraphs (i), (ii) and (iii) resulting from the decomposition thereof below about 350° C.

The variable Z as defined above represents a chalcogen selected from the group consisting of sulfur, selenium, sulfur-selenium mixtures, sulfur-oxygen mixtures and selenium-oxygen mixtures. Desirably, Z is selected from the group consisting of sulfur and selenium. Preferably, the chalcogen Z is sulfur.

The compounds of formula (1) above include those wherein one or more hydrogens is substituted with a radical selected from alkyl radicals having 1 to 20 carbon atoms and alkyl amine radicals having 1 to 20 carbon atoms. By alkyl amine radicals is meant alkyl radicals having $-NH_2$ substituents thereon. Desirably, one or more hydrogens of the compounds of formula (1) is substituted with a radical selected from alkyl radicals having 1 to 12 carbon atoms. Preferably, these are alkyl radicals having 1 to 4 carbon atoms and alkyl amine radicals having 1 to 4 carbon atoms.

The compounds of formula (2) above are those wherein R is a methylene radical or a polymethylene radical having 2 to 20 carbon atoms. Desirably, R is a methylene radical or a polymethylene radical having 2 to 12 carbon atoms. Preferably, R is a methylene radical or a polymethylene radical having 2 to 4 carbon atoms.

Of all the compounds used as cathode active materials in the cells of the present invention, those of formula (1) above, and the mentioned decomposition products thereof, are advantageous.

Among the many cathode active materials which are used in the cells of the present invention are:
$(NH_4)_2MoS_4$
$(NH_4)_2MoSe_4$
$(NH_4)_2MoS_{4-a}Se_a$
$(NH_4)_2MoS_{4-a}O_a$
$(NH_3CH_3)_2MoS_4$
$(NH_3CH_3)(NH_3C_2H_5)MoS_2O_2$
$(NH_3C_8H_{17})(NH_4)MoSe_4$
$(NH_3C_2H_4NH_2)_2MoS_4$
$(NH_3C_2H_4NH_3)MoS_4$
$(NH_3C_{10}H_{20}NH_3)MoSe_4$ and the like, wherein $4>a>0$. It should now be obvious to the artisan that various homolog and analog compounds of the foregoing are intended to be included herein commensurate with the scope of the above formulas. Also, as mentioned above, the decomposition products of the foregoing are included.

The above-mentioned cathode active compounds may be prepared by known techniques and are believed to be within the purview of the artisan. For example, ammonium thiomolybdate or substituted ammonium thiomolybdate may be formed by passing sulfurous vapors through a solution of ammonium molybdate or substituted ammonium molybdate, respectively. In any event, the amorphous decomposition products of the ammonium-molybdenum-chalcogen (substituted or unsubstituted) may be obtained at temperatures below about 350° C. and this may be done either by thermal decomposition or chemical decomposition. Thus, heating the ammonium-molybdenum-chalcogen (substituted or unsubstituted) at temperatures about 50° or so and up to as high as 350° will effect, at least to some degree, the thermal decomposition of the compound (see, for example, T. P. Prasad et al, Journal of Inorganic and Nuclear Chemistry, Vol. 35, p. 1895 et seq. (1973)). On the other hand, decomposition may be achieved by chemical reaction using an acid medium, e.g., by treatment of the compound with an acid such as formic acid (see, for example, F. T. Eggersten et al, Journal of Physical Chemistry, Vol. 63, p. 1981 et seq. (1959)). Although formic acid has been chosen as the acid medium for chemical decomposition in the example below, it should be noted that other acids such as acetic acid, chloroacetic acid, benzoic acid, citric acid, hydrochloric acid, phosphoric acid, hydrobromic acid, sulfuric acid and the like may be employed. In fact, any acid may be used to effect the chemical decomposition of the ammonium-molybdenum-chalcogen compound, as long as sufficient acid is employed to establish a pH in the range of about 2 to about 5, to obtain the amorphous decomposition product.

If the decomposition products of ammonium thiomolybdate are formed either by thermal treatment or chemical treatment, at temperatures below about 350° C., products of generally amorphous structure are attained with a sulfur metal ratio greater than 2.5 but less than 4, whereas heating at higher temperatures results in conversion to molybdenum disulfide. The sulfide decomposition products obtained below about 350° C. have surprisingly been found to effect significantly higher energy density electrochemical cells than the molybdenum disulfides obtained by thermal decomposition about 350+ C. or so. (This will become more evident by illustration in the examples below.)

The cathode active materials of the compounds described above which have been decomposed, at least in part, by thermal or chemical activity, may be characterized as generally amorphous in nature, with no sharp reflections being apparent in X-ray diffractometer studies. Further, no platelets typical of the disulfides, described in U.S. Pat. No. 4,009,052, or fibers typical of the trisulfides, described in U.S. Pat. No. 3,864,167, were observed in the scanning electron microscope. In fact, thermally decomposed samples were found to maintain the morphology of the formula (1) compound.

Advantageously, the cathode active compounds of the present invention cells may simply be hot pressed into a cathode structure (wherein at least partial thermal decomposition is inherent), although the thermal or chemical decompositions described may be employed prior to cathode construction. The cathode-active material may be supported on structures such as carbon, copper, nickel, stainless steel, iron, etc., and it may be supported on such materials or it may be impregnated into such materials. Advantageously, the cathode does not contain any conductive diluents within the cathode active material, such as carbon. However, plastic binding agents such as polyfluoroethylene may be utilized if desired.

The electrolyte used in the cell of the present invention is any electrolyte which is chemically inert with respect to the anode and with respect to the cathode, and which permits the migration of ions between the anode and the cathode. In general, the choice of electrolyte depends upon the anode-active material being used in the cell. Thus, where the anode-active material is a Group IA metal, the electrolyte will most likely be nonaqueous. However, where the anode-active material is one which is selected, for example, from the Group IIB metals, an aqueous electrolyte may be employed. When the preferred anode-active material selected from the Group IA metals is used in a cell in the present invention, the electrolyte may typically be a non-aqueous alkali metal salt-organic solvent electrolyte solution. These alkali metal salts are well known in the art and need not be enumerated herein. However, such salts include the lithium and sodium salt complexes which are dissolved in organic solvents such as the inertly substituted and unsubstituted ethers, sulfones, organic sulfates, organic sulfites, organic nitrites and organic nitro compounds. One preferred electrolyte for use in conjunction with cells containing lithium as its anode-active material is an electrolyte containing lithium perchlorate salt dissolved in dioxolane or a dioxolane-containing solution. One preferred electrolyte in cells containing sodium as its anode-active material contains sodium triethyl pyrrole boron dissolved in a cyclic ether containing solution. Alternatively, solid electrolytes, such as the beta aluminas or halides, or molten salts, may be used.

The electric current-producing cells of the present invention containing the above-mentioned anodes, cathodes and electrolytes not only have high energy densities, but are also capable of being cycled through charging and discharging, and may be readily produced on a large-scale basis.

The present invention is illustrated by the following examples, but the invention should not be construed by being limited thereto.

EXAMPLE 1

Ammonium thiomolybdate was precipitated from an ammoniacal aqueous solution of ammonium molybdate by bubbling hydrogen sulfide through it. This precipitate was filtered under nitrogen. It was then mixed with 20 wt. % carbon and 10 wt. % polyfluoroethylene powder and pressed into an expanded stainless steel grid first at room temperature and then at 300° C. The grid had about 2 cm$^2$ of active cathode material. A cell was then prepared by surrounding the cathode screen with polypropylene separators and then pure lithium metal which served as the anode. This assembly was then immersed into a 2 molar solution of lithium perchlorate in dioxolane. The cell was then discharged at 1 ma to a cut-off of 1.4 volts; about 75% of the capacity was obtained between 1.75 and 2.0 volts. The capacity on the first discharge was 1.78 kilo coulombs/gm of thiomolybdate. The cell was then repetitively cycled more than twenty times between 1.40 and 2.70 volts showing its high reversibility.

EXAMPLE 2

A cell, constructed and tested just as in Example 1 except that no carbon was added as a conductive diluent, showed similar electrochemical characteristics with a capacity of 1.73 kilo coulombs/gm. Ready reversibility was also observed, thus indicating that it is not necessary to add a conductive diluent to cells containing ammonium thiomolybdate as a cathode active material.

EXAMPLE 3

A cell was constructed as in Example 1 except that the electrolyte was a 1 molar solution of sodium triethyl pyrrole boron in dioxolane and the anode was sodium pressed into an expanded stainless steel screen. The initial open circuit voltage was 2.23 volts, and under discharge at 1 ma, 1.35 kilo coulombs of capacity/gm of thiomolybdate were obtained between 2.2 volts and 1.25 volts. More than ten discharge cycles were obtained between 1.25 and 2.5 volts showing that this sodium cell is also highly reversible.

EXAMPLE 4

Ammonium thiomolybdate formed as in Example 1 was heated (in argon) at 10° C./min up to 1000° C. on a thermogravimetric analyzer. 19.2% of its initial weight was lost by 250° C. and a further 17.9% was lost beginning at about 370° C. The final reaction product was identified as molybdenum disulfide by x-ray analysis.

EXAMPLE 5

Ammonium thiomolybdate formed as in Example 1 was heated in 5 wt.% dibenzothiophene in decalin at about 250° C. for 1 hour in a Carberry Reactor and then heated at 350° C. under dibenzothiophene and hydrogen for 8 hours at a total pressure of 450 psi. A cell was then constructed as in Example 2 using this material as the active cathode material. The capacity on the first discharge was found to be 0.24 kilo coulombs/gm substantially lower than those of the first three examples. This indicates that the active materials of this invention are those formed prior to the second weight loss found in Example 4.

EXAMPLE 6

Ammonium thiomolybdate was chemically decomposed in this example before cathode construction. 200 ml of a 5% aqueous ammonium thiomolybdate solution was diluted with 500 ml H$_2$O at 5° C. and its pH dropped to 3 by addition of 5% formic acid. It was then heated at 50° C. for ½ hour, cooled and allowed to stand overnight. Following this, it was filtered out and washed with 5% formic acid followed by 200 proof ethanol. Finally, it was dried in a vac-oven first at room temperature and then for 5 hours at 150° C. This material had a BET surface area of 28.82 m$^2$/gm. Treatment of this compound with butyl lithium showed that 4.5 moles of n-butyl lithium were consumed per mole of molybdenum. This high reactivity for lithium shows the utility of these molybdenum sulfur compositions as active cathode materials.

EXAMPLE 7

A battery was constructed as in Example 1 but using the molybdenum sulfur compound formed in Example 6. This cell had a capacity of 1.88 kilo coulombs/gm on the first discharge with a mean discharge voltage of 1.85 volts; these values give a theoretical energy density of 856 Watt-hours/kg (includes weight of Li and cathode). The cell was cycled between 2.7 and 1.4 volts 18 times thus showing its high reversibility.

EXAMPLE 8

A battery was constructed as for Example 7 but with the sodium electrolyte and sodium anode configuration used in Example 3. On the first discharge, this cell had a capacity of 1.53 kilo coulombs/gm and was subsequently cycled more than 4 times between 2.5 and 1.25 volts, thus again showing the ready reversibility of this cathode material.

EXAMPLE 9

Three samples of the precipitate formed as in Example 6 were heated for 1 hour at 250° C., 400° C. and 600° C., respectively, in a preheated oven and were then cooled under a nitrogen atmosphere. These three samples had BET surface areas of 18, 101 and 43 m²/gm, respectively, as measured by nitrogen adsorption. Cells were constructed as in Example 1 and their capacities were found to be 1.80, 0.12 and 0.25 kilo coulombs/gm respectively. This shows that heating the samples at temperatures of 400° C. and above causes a substantial reduction in their capacity; these two samples have a composition corresponding to molybdenum disulfide. In addition, these three samples indicate that high surface area, that is, small particle size, does not necessarily confer a high electrochemical activity.

EXAMPLE 10

A cell was constructed as in Example 1 except that a single crystal of natural molybdenite (MoS$_2$) weighing 150 mg served as the cathode. The capacity of this cell was very low, 0.006 kcoul/gm, even when the discharge current was reduced to 0.1 ma.

EXAMPLE 11

5.0 gm of MoCl$_4$ was added to ethyl acetate, then 1.9 gms of Li$_2$S. This mixture was stirred for two days, filtered and then washed with methanol and ethyl acetate. This was performed under nitrogen and as described in copending application U.S. Pat. No. 641,424. An electrochemical cell was constructed of this molybdenum disulfide as in Example 1. The capacity of this cell was 0.49 kilo coulombs/gm in the first discharge, considerably less than those of Examples 1, 3, 5, and 7. This clearly shows that molybdenum disulfide even if prepared at low temperatures does not have comparable capacities of the materials of this invention.

EXAMPLE 12

The ethylene diamine salt of thiomolybdate was prepared by addition of 15 cc of ethylene diamine to 2 gm of ammonium thiomolybdate. 60 ml of methanol was then added giving an orange precipitate; after washing with hot methanol. The red ethylene diamine thiomolybdate was collected. This was then formed into a cathode as in Example 1 and was discharged and charged more than 50 times showing its high reversibility.

The dodecamine salt of thiomolybdate was prepared by the reaction between 2.6 gm of ammonium thiomolybdate and 4.4 gms of dodecamine hydrochloride in 100 cc of methanol. The orange solid precipitated was formed into a cathode as in Example 1 and was cycled more than 40 times, again indicating the high reversibility of cathodes derived from these substituted ammonium thiomolybdates.

EXAMPLE 13

Ammonium thiomolybdate formed as in Example 1 was reacted with n-butyl lithium in hexane. When 1 equivalent of n-butyl lithium was added, all the lithium was consumed by the ammonium thiomolybdate. During the reaction the molybdate changed from its characteristic red to a black color. When five equivalents of n-butyl lithium were reacted with the molybdate, two equivalents of the lithium were consumed. This high reactivity for lithium shows the utility of these molybdenum sulfur compositions as active cathode materials.

What is claimed is:

1. An electric current-producing cell, comprising:
   (a) an anode having as its anode-active material one or more metals selected from the group consisting of the Periodic Table Group IA metals, Group IB metals, Group IIA metals and Group IIB metals;
   (b) a cathode having as its cathode active material one or more compounds selected from the group consisting of:
   (i) those having the formula:

$$(NH_4)_xMoZ_y \qquad (1)$$

wherein Z is a chalcogen selected from the group consisting of sulfur, selenium, sulfur-selenium mixtures, sulfur-oxygen mixtures and selenium-oxygen mixtures wherein x is a numerical value of about 2, and wherein y is a numerical value of about 4;
   (ii) compounds of the above formula wherein one or more hydrogens is substituted with a radical selected from alkyl radicals having 1 to 20 carbon atoms and alkyl amine radicals having 1 to 20 carbon atoms;
   (iii) those having the formula:

$$(NH_3-R-NH_3)MoZ_y \qquad (2)$$

wherein R is a methylene radical or a polymethylene radical having 2 to 20 carbon atoms, and wherein Z and y are as defined; and,
   (iv) the amorphous decomposition products of one or more compounds of subparagraphs (i), (ii) and (iii) resulting from the decomposition thereof below about 350° C.; and
   (c) an electrolyte which is chemically inert with respect to said anode and said cathode and which permits the migration of ions between said anode and said cathode.

2. The cell of claim 1 wherein the cathode active material compounds of subparagraph (ii) consist of compounds of formula (1) wherein one or more hydrogens is substituted with a radical selected from alkyl radicals having 1 to 12 carbon atoms and alkyl amine radicals having 1 to 12 carbon atoms.

3. The cell of claim 2 wherein one or more of said hydrogens is substituted with a radical selected from alkyl radicals having 1 to 4 carbon atoms and alkyl amine radicals having 1 to 4 carbon atoms.

4. The cell of claim 1 wherein the cathode active material compounds of subparagraph (iii) consist of compounds of formula (2) wherein R is a methylene radical or a polymethylene radical having 2 to 12 carbon atoms.

5. The cell of claim 4 wherein R is a methylene radical or a polymethylene radical having 2 to 4 carbon atoms.

6. The cell of claim 5 wherein Z is a chalcogen selected from the group consisting of sulfur and selenium.

7. The cell of claim 6 wherein said chalcogen Z is sulfur.

8. The cell of claim 1 wherein said anode has as its anode active material one or more metals selected from the Group IA metals.

9. The cell of claim 8 wherein the cathode active material compounds of subparagraph (ii) consist of compounds of formula (1) wherein one or more hydrogens is substituted with a radical selected from alkyl radicals having 1 to 12 carbon atoms and alkyl amine radicals having 1 to 12 carbon atoms.

10. The cell of claim 9 wherein one or more of said hydrogens is substituted with a radical selected from alkyl radicals having 1 to 4 carbon atoms and alkyl amine radicals having 1 to 4 carbon atoms.

11. The cell of claim 8 wherein the cathode active material compounds of subparagraph (iii) consist of compounds of formula (2) wherein R is a methylene radical or a polymethylene radical having 2 to 12 carbon atoms.

12. The cell of claim 11 wherein R is a methylene radical or a polymethylene radical having 2 to 4 carbon atoms.

13. The cell of claim 12 wherein Z is a chalcogen selected from the group consisting of sulfur and selenium.

14. The cell of claim 13 wherein said chalcogen Z is sulfur.

15. The cell of claim 1 wherein said anode has lithium as its cathode active material.

16. The cell of claim 15 wherein the cathode active material compounds of subparagraph (ii) consist of compounds of formula (1) wherein one or more hydrogens is substituted with a radical selected from alkyl radicals having 1 to 12 carbon atoms and alkyl amine radicals having 1 to 12 carbon atoms.

17. The cell of claim 16 wherein one or more of said hydrogens is substituted with a radical selected from alkyl radicals having 1 to 4 carbon atoms and alkyl amine radicals having 1 to 4 carbon atoms.

18. The cell of claim 15 wherein the cathode active material compounds of subparagraph (iii) consist of compounds of formula (2) wherein R is a methylene radical or a polymethylene radical having 2 to 12 carbon atoms.

19. The cell of claim 18 wherein R is a methylene radical or a polymethylene radical having 2 to 4 carbon atoms.

20. The cell of claim 19 wherein Z is a chalcogen selected from the group consisting of sulfur and selenium.

21. The cell of claim 20 wherein said chalcogen Z is sulfur.

22. The cell of claim 1 wherein said cathode has as its cathode active material one or more compounds selected from the group consisting of:
(i) compounds having the formula:

$$(NH_4)_x MoZ_y \quad (1)$$

wherein Z, x and y are as defined; and,
(ii) the amorphous decomposition products thereof resulting from decomposition below about 350° C.

23. The cell of claim 22 wherein Z is a chalcogen selected from the group consisting of sulfur and selenium.

24. The cell of claim 23 wherein said chalcogen Z is sulfur.

25. The cell of claim 22 wherein said anode has as its anode active material one or more metals selected from the Group IA metals.

26. The cell of claim 25 wherein Z is a chalcogen selected from the group consisting of sulfur and selenium.

27. The cell of claim 26 wherein said chalcogen Z is sulfur.

28. The cell of claim 22 wherein said anode has lithium as its cathode active material.

29. The cell of claim 28 wherein Z is a chalcogen selected from the group consisting of sulfur and selenium.

30. The cell of claim 29 wherein said chalcogen Z is sulfur.

31. The cell of claim 22 wherein said decomposition is thermal decomposition achieved by hot pressing said cathode active material into said cell.

32. The cell of claim 31 wherein Z is a chalcogen selected from the group consisting of sulfur and selenium.

33. The cell of claim 32 wherein said chalcogen Z is sulfur.

34. The cell of claim 31 wherein said anode has as its anode active material one or more metals selected from the Group IA metals.

35. The cell of claim 34 wherein Z is a chalcogen selected from the group consisting of sulfur and selenium.

36. The cell of claim 35 wherein said chalcogen Z is sulfur.

37. The cell of claim 31 wherein said anode has lithium as its cathode active material.

38. The cell of claim 37 wherein Z is a chalcogen selected from the group consisting of sulfur and selenium.

39. The cell of claim 38 wherein said chalcogen Z is sulfur.

* * * * *